Patented Oct. 12, 1954

2,691,654

UNITED STATES PATENT OFFICE 2,691,654

AMINO HETEROCYCLES AND METHOD OF MAKING

George H. Hitchings, Tuckahoe, and Gertrude B. Elion, Bronxville, N. Y., assignors to Burroughs Wellcome & Co. (U. S. A.) Inc., Tuckahoe, N. Y., a corporation of New York No Drawing. Application June 11, 1952, Serial No. 292,975

6 Claims. (Cl. 260—247.5)

The present invention relates to a novel process for making derivatives of purine substituted in the 6-position by a substituted amino group.

It has been found that 6-substituted purines of Formula (IV) may conveniently be synthesized from 6-hydroxypurine (hypoxanthine) (I) by the conversion of the latter into 6-mercaptopurine, which can then be alkylated to a 6-alkyl-mercaptopurine; this reacts with aliphatic, aryl and cyclic amines to give N-substituted 6-aminopurines.

In the above formulae R is a lower alkyl group and $R^1$ may be hydrogen or an alkyl group, $R^2$ may be an alkyl, substituted alkyl, aryl or substituted aryl group and an amino group, or $R^1$ and $R^2$ may together complete a heterocyclic system such as a pyrrolidine, piperidine or morpholine.

The group chosen for R is most conveniently a methyl group and any suitable agent such as dimethyl sulphate or methyl iodide may be used for conversion of (II) to (III).

The substituted purines obtained by the novel process of the present invention are of importance in the investigation of biological metabolism and as inhibitors of the growth of microorganisms.

The invention will now be illustrated by the following examples in which all temperatures are given in degrees centigrade.

EXAMPLE 1

6-mercaptopurine

Hypoxanthine, (18.5 g.) phosphorus pentasulfide (80 g.) and tetralin (500 ml.) were heated at 200° for 8 hours. The mixture was cooled and filtered. The solid residue, after being washed with petroleum ether and dried at room temperature, was boiled with 2 liters of water. The hot solution was filtered and the pH adjusted to 5 with ammonium hydroxide. Dark yellow crystals of 6-mercaptopurine hydrate (12 g.) precipitated on standing. Concentration of the mother liquors led to the recovery of 5 g. of unreacted hypoxanthine.

EXAMPLE 2

6-methylmercaptopurine 6-mercaptopurine hydrate (8 g.) was dissolved in 25 ml. of 2 N sodium hydroxide and 50 ml. of water. Dimethyl sulfate (4.3 ml.) was added slowly with shaking over a period of 15 minutes and the reaction mixture allowed to stand overnight. The 6-methylmercaptopurine crystallized in needles as a trihydrate (7.5 g.). After recrystallization from water and drying at 120° the produce melted at 218–220°.

EXAMPLE 3

6-methylmercaptopurine 5.1 g. of 6-mercaptopurine hydrate was dissolved in 15 ml. of 2 N sodium hydroxide and 25 ml. of water. Methyl iodide (1.3 ml.) was added dropwise with shaking. After 2 hours, the reaction mixture was brought to pH 5 with acetic acid, the precipitate of colorless needles of 6-methylmercaptopurine filtered off, washed with water and dried at 120° (3.8 g.).

EXAMPLE 4

6-dimethylaminopurine 6-methylmercaptopurine trihydrate (3.1 g.) was heated at 130° with 20 ml. of 25% aqueous dimethylamine for 15 hours in a sealed vessel. After cooling, the reaction mixture was taken to dryness on the steam bath, and the produce recrystallized from 30 ml. of water. A colorless crystalline precipitate of 6-dimethylaminopurine (2.4 g.) was obtained, melting at 260–263°.

EXAMPLE 5

6-ethylaminopurine 6-methylmercaptopurine trihydrate (4.5 g.) was heated with 10 ml. of 30% aqueous ethylamine solution at 130°, for 16 hours. After cooling, the contents of the bomb were evaporated to dryness on the steam bath. The residue was washed with 25 cc. cold water and dried at 110° (3.1 g.). After recrystallization from water, the 6-ethylaminopurine melted at 238–239°.

EXAMPLE 6

6-n-butylaminopurine 6-methylmercaptopurine trihydrate (2.8 g.) was heated with 4.5 ml. of n-butylamine and 10 ml. of water at 130° for 16 hours. The product was evaporated to dryness on the steam bath, in 100 ml. of dilute sodium hydroxide and reprecipitated by acidification with acetic acid. The 6-n-butylaminopurine (1.2 g.) melted at 233–234°.

EXAMPLE 7

6-anilinopurine 6-methylmercaptopurine trihydrate (1 g.) was refluxed with 5 ml. of aniline for 9 hours. The mixture was cooled, diluted with 50 ml. of petroleum ether and the insoluble residue filtered off. The 6-anilinopurine (0.85 g.) after recrystallization from 25% aqueous ethanol, melted at 278–281°.

EXAMPLE 8

6-p-chloroanilinopurine 6-methylmercaptopurine trihydrate (5 g.) was heated with 10 g. p-chloroaniline at 180° for 20 hours. The product was washed well with ether to remove the excess p-chloroaniline. The residue was then dissolved in 50 ml. of hot concentrated hydrochloric acid, the solution filtered, and the filtrate diluted with 300 ml. of water. The product was filtered off, washed with water and dried at 110°. The p-chloroanilinopurine (2.0 g.) melted at 322–323°.

EXAMPLE 9

6-hydrazinopurine 6-methylmercaptopurine trihydrate (2.5 g.) was heated with a 2 ml. of a 85% aqueous solution of hydrazine hydrate at 110°, for 16 hours in a sealed tube. The product was taken to dryness on the steam bath and recrystallized from 100 ml. of water. The 6-hydrazinopurine (1.3 g.) melted at 250°.

EXAMPLE 10

6-β-aminoethylamino 6-methylmercaptopurine trihydrate (4.6 g.) was heated with 5 ml. of ethylenediamine and 10 ml. of water at 130° for 16 hours in a sealed tube. The reaction mixture was taken to dryness on the steam bath. The residue was taken up in 100 ml. of ethanol and a small insoluble residue filtered off. The alcoholic solution was taken down to a volume of 50 ml. and 200 ml. of anhydrous ether were added slowly. The precipitate was centrifuged off, redissolved in ethanol and converted to the hydrochloride with ethanolic hydrogen chloride. The hydrochloride was filtered off, washed with alcohol and dried in a vacuum desiccator. The yield of 6-β-aminoethylaminopurine hydrochloride was 2.5 g., melted at 262–264°.

EXAMPLE 11

6-morpholinopurine 6-methylmercaptopurine trihydrate (2 g.) was heated with 3 g. of morpholine and 10 ml. of water at 130° for 16 hours in a sealed tube. The reaction mixture, which had solidified, was washed with 100 ml. of water. The product, 6-morpholinopurine (2.1 g.) melted at 303–304°.

In a similar manner 6-piperidinopurine and 6-pyrrolidinopurine were prepared by reacting 6-methylmercaptopurine trihydrate with piperidine and pyrrolidine in a sealed tube.

EXAMPLE 12

6-methylaminopurine 6-methylmercaptopurine (4 g.) trihydrate was heated with 10 ml. of 25% aqueous methylamine at 130° for 16 hours in a sealed tube. The reaction mixture was evaporated to dryness on the steam bath. The product was converted to its hydrochloride by solution in an alcoholic solution of hydrogen chloride (10 ml., 35%) and precipitation by the addition of ether (50 ml.).

EXAMPLE 13

6-diethylaminopurine 6-methylmercaptopurine trihydrate (3 g.) was heated at 150° with 5 g. of diethylamine and 10 ml. of water for 17 hours at 150° in a sealed tube. After evaporation to dryness, the residue was dissolved in 10 ml. of ethanol and 10 ml. of 35% alcoholic hydrogen chloride. The hydrochloride of 6-diethylaminopurine was precipitated by the addition of 200 ml. of ether.

EXAMPLE 14

6-n-decylaminopurine

A mixture of 6.1 g. of 6-methylmercaptopurine and 15.7 g. of n-decylamine was heated at 140° for 18 hours in a sealed tube. The reaction mixture was cooled and washed with petroleum ether to remove the excess amine. The 6-n-decylaminopurine, after recrystallization from 65% ethanol, melted at 166–167°.

We claim:

1. The process of making 6-aminopurines which comprises the steps of reacting hypoxanthine with phosphorus pentasulfide, reacting the resulting compound with an alkylating agent selected from the class consisting of lower alkyl esters of oxygen containing acids of sulfur in which S has a valence of 6 and the lower alkyl esters of hydrohalic acids to form a 6-alkylmercaptopurine and reacting the latter derivative with an amine to form the 6-aminopurine.

2. The process of making 6-aminopurines which comprises reacting a 6-mercaptopurine with an alkylating agent selected from the class consisting of lower alkyl esters of oxygen containing acids of sulfur in which S has a valence of 6 and the lower alkyl esters of hydrohalic acids and reacting the latter derivative with an amine to form the 6-aminopurine.

3. The process of making compounds of the formula

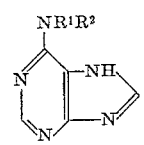

wherein $R^1$ is selected from the class consisting of hydrogen and the alkyl groups, $R^2$ is selected from the class consisting of alkyl and aryl groups, and $R^1$ and $R^2$ form together pyrrolidino, piperidino and morpholino groups, which comprises reacting the corresponding 6-hydroxypurine with phosphorus pentasulfide to form a 6-mercaptopurine, alkylating the 6-mercaptopurine with an alkylating agent selected from the class consisting of lower alkyl esters of oxygen containing acids of sulfur in which S has a valence of 6 and the lower alkyl esters of hydrohalic acids and reacting the latter compound with an amine of the formula $-NHR^1R^2$ wherein $R^1$ and $R^2$ have the above specified values.

4. The process of making 6-aminopurines which comprises the step of reacting 6-alkylmercaptopurine with an amine.

5. 6-anilinopurine.

6. 6-morpholinopurine.

References Cited in the file of this patent

Beilstein, vierte Auflage, vol. 26, p. 592.

Hitchings et al.: J. Biol. Chem., 185, 651–655 (1950).